UNITED STATES PATENT OFFICE.

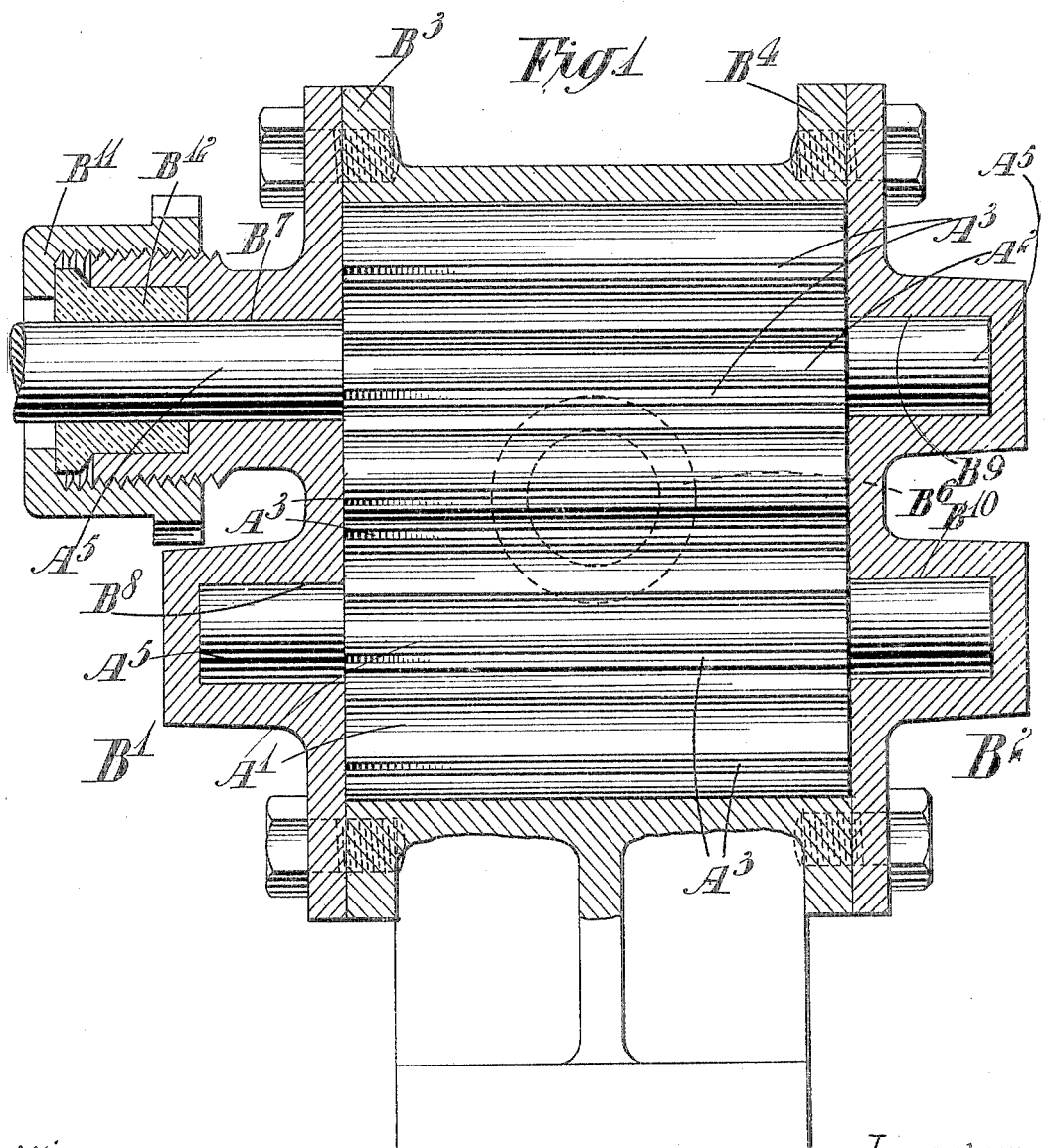

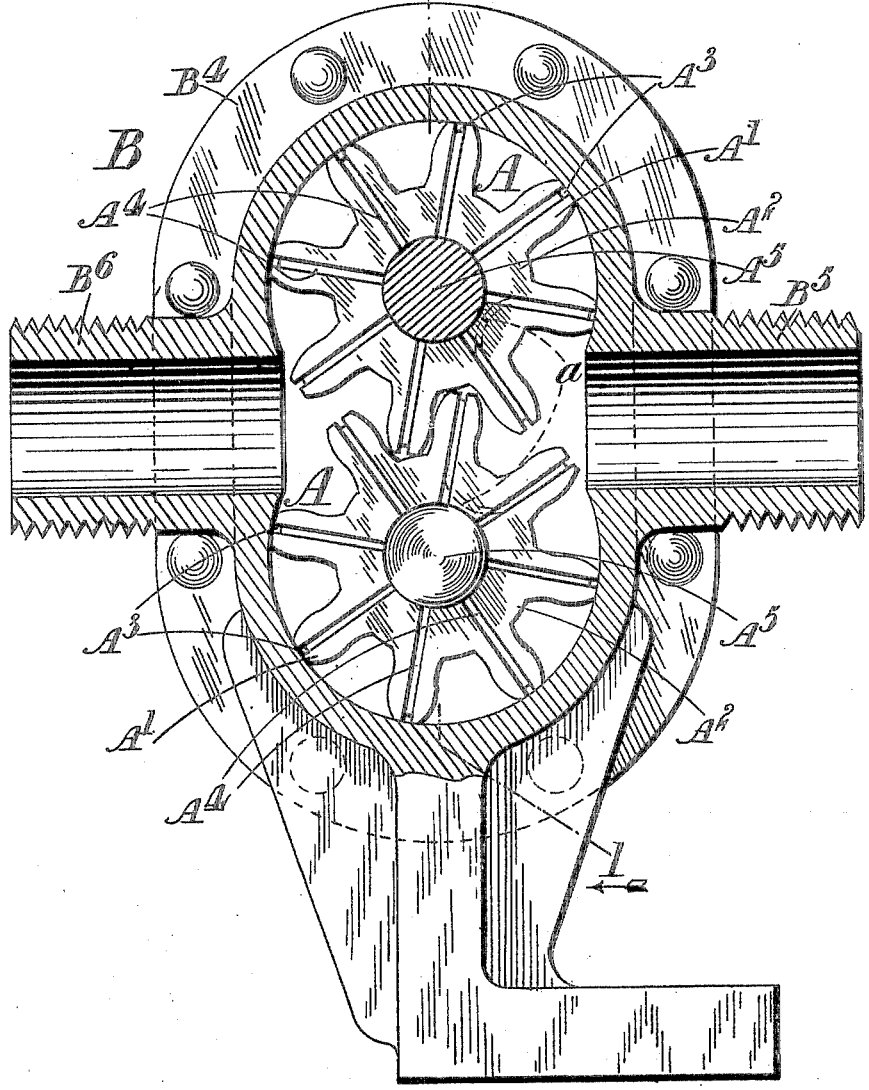

HENRY HANDOLL, OF LONDON, ENGLAND, ASSIGNOR TO ROBERT JAMES WHITE AND JOHN GEORGE WHITE, TRADING AS THE ALBANY ENGINEERING COMPANY, OF CAMBERWELL, LONDON, ENGLAND.

ROTARY PUMP.

No. 804,657.     Specification of Letters Patent.     Patented Nov. 14, 1905.

Application filed December 12, 1904. Serial No. 236,608.

*To all whom it may concern:*

Be it known that I, HENRY HANDOLL, a subject of the King of Great Britain, and a resident of Camberwell, London, England, have invented certain new and useful Improvements in or Relating to Rotary Pumps, of which the following is a specification.

This invention relates to rotary pumps, and has for its chief object to prevent leakage between the rotating member or members and the casing.

According to this invention water-cushions are provided between the rotating member or members and the casing for this purpose. These water-cushions are provided between the faces or edges of the rotating members and the curved wall of the casing and also between the ends of the casing and the ends of the rotating members.

Referring to the drawings, Figure 1 is a sectional side elevation on the line 1 1 of Fig. 2, and Fig. 2 is a sectional end elevation of a rotary pump having two rotating members geared together and provided with water-cushions in accordance with this invention.

The rotating members A are mounted in a casing B and consist of cylindrical parts $A^2$, having radial blades $A'$, forming with the casing chambers or spaces extending in a direction parallel to the axes of the cylindrical members. These members A have end portions $A^5$, which rotate in bearings $B^7$ $B^8$ $B^9$ $B^{10}$, formed, respectively, on the end caps $B'$ $B^2$, which are secured to flanges $B^3$ $B^4$ of the casing by bolts or studs. The bearings are so arranged that the blades $A'$ of the two members intermesh, so that by rotating one member the other member is driven back. Conveniently one of the end portions $A^5$ of one of the rotating members is extended through a stuffing-box $B^{11}$ $B^{12}$ to receive the drive. The blades $A'$ of the rotating members A are preferably so formed that viewed endwise they are shaped like involute teeth; but they may be otherwise formed. Along the face of each blade is formed one or more grooves $A^3$, which extend from end to end of the blade, so that in rotating a body of water lodges in the groove, forming a water-cushion between the blade and the casing. At each end the rotating members are provided with grooves $A^4$, which radiate from the boss or bearing-piece $A^5$ and extend to the outer point of the tooth. These grooves also receive water and prevent leakage between the ends of the rotating member and the casing. $B^5$ and $B^6$ are the liquid inlet and outlet of the casing, and as they communicate with the grooves $A^3$ they form feeders for distributing the water-packing, each water-packing thus extending from the central part at one end radially outward, thence along one of the blades, and thence radially to the central part at the opposite end of the rotary member. The grooves are only open to the surface of the rotary member and are completely closed by the casing throughout the portion of their movement when it is desired that the packing be effective.

The grooves $A^4$ instead of being as shown in full lines may be so arranged that they communicate in pairs, as indicated by the broken line $a$.

Although the invention has been described as applied to a rotary pump wherein two rotating members are employed, it is to be understood that it is not intended to so limit the invention, as it is equally applicable to other forms of pumps.

What I claim as my invention, and desire to secure by Letters Patent, is—

1. In a rotary pump, the combination with the casing having radial end walls, of a rotary member journaled in said casing, said rotary member embodying a central cylindrical part and blades projecting radially therefrom, the end surfaces of the cylindrical part and blades being radial and working in proximity to the radial faces of the casing, and the peripheries of the blade being cylindrical and working in proximity to the cylindrical face of the casing, said rotary member having end grooves extending radially throughout the radial faces of the cylindrical part and blades and grooves extending parallel with the axis throughout the peripheral faces of the blades, said grooves being completely closed by the casing when the blades are in the cylindrical part thereof; substantially as described.

2. In a rotary pump, the combination with the casing having radial and cylindrical faces, of two rotary members journaled therein, each embodying a cylindrical central part and radial blades, the blades of the two members intermeshing and each rotary member having radial grooves extending throughout and open only to the faces of the cylindrical parts and blades and peripheral grooves connecting opposite radial grooves and extending throughout the blades parallel with the axis, all of said grooves being adapted to be completely closed by the radial and cylindrical faces of the casing.

In testimony whereof I have signed my name to this specification in the presence of two subscribing witnesses.

HENRY HANDOLL.

Witnesses:
   HAROLD WADE,
   HARRY B. BRIDGE.